No. 823,611. PATENTED JUNE 19, 1906.
H. T. MARTIN.
HAND VISE.
APPLICATION FILED APR. 7, 1906.

WITNESSES:

INVENTOR
Harry T. Martin
BY
Erwin & Wheeler
ATTORNEYS.

UNITED STATES PATENT OFFICE.

HARRY T. MARTIN, OF MILWAUKEE, WISCONSIN.

HAND-VISE.

No. 823,611.  Specification of Letters Patent.  Patented June 19, 1906.

Application filed April 7, 1906. Serial No. 310,454.

*To all whom it may concern:*

Be it known that I, HARRY T. MARTIN, a citizen of the United States, residing at the city of Milwaukee, county of Milwaukee, and State of Wisconsin, have invented new and useful Improvements in Hand-Vises, of which the following is a specification.

My invention relates to improvements in hand-vises; and it pertains to that class in which the clamping-jaws of the vise are parallel with each other both when in their opened and closed positions and at all intermediate points between their opened and closed positions.

The construction of my invention is explained by reference to the accompanying drawings, in which—

Figure 1:
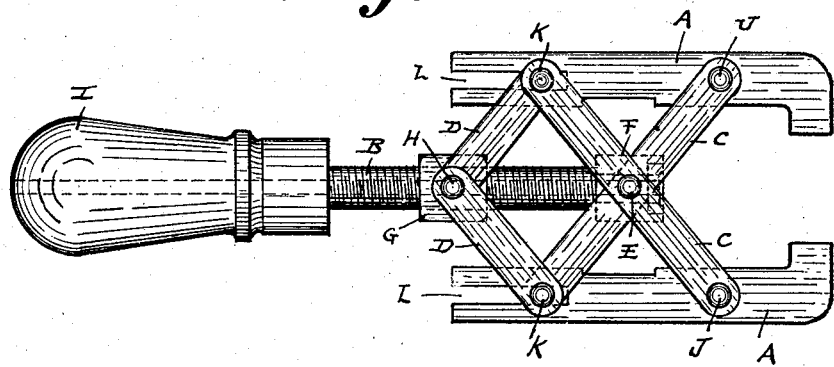
Figure 2:
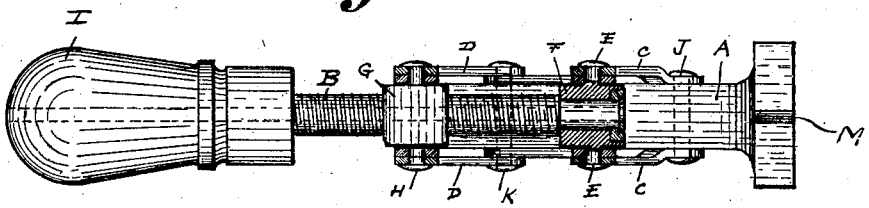

Figure 1 is a plan view, and Fig. 2 a longitudinal transverse section.

Like parts are identified by the same reference characters throughout both views.

A A represent the clamping-jaws, which are pivotally supported from the central screw-threaded shaft B by two sets of crossed levers C C, D D, pivotal bolt E, collar F, nut G, and pivot H. It will be understood that the screw-threaded shaft B is rigidly fixed to the handle I and is adapted to turn freely within the collar F, while the nut G is adapted to move forwardly and backwardly upon said shaft B as the same is turned toward the right and left. The crossed levers C are secured at a fixed point to the jaws A by the pivots J J, while their opposite ends are secured to the opposite ends of said jaws by pivots K K, operating in the elongated slots L L, formed in said jaws, while the diverging ends of the crossed levers D are also secured to the contiguous ends of the crossed levers C by said pivots K, the same pivots K being adapted to serve the twofold purpose of connecting the contiguous ends of the levers C and D and also to connect the contiguous ends of said levers with said jaws within the slots L. Thus it will be obvious that when the jaws are held in connection with a nut or other object which it is desirous to clamp and the handle I is turned forward the nut G will be drawn rearwardly, or toward the handle on the screw-threaded shaft B, whereby said jaws A will be drawn toward each other and caused to clamp the nut or other object, while by a reverse movement of the handle the nut G will be caused to move forwardly or away from the handle, whereby said jaws will be separated preparatory to grasping the object which it is desirous to clamp. It will also be obvious that by this arrangement both the front and rear ends of the clamping-jaws will be retained parallel to each other as the clamping-surfaces of the jaws are moved toward or from each other.

For the purpose of distinguishing between the crossed levers C and the crossed levers D the crossed levers C are herein referred to as the "two-arm" crossed levers, the outer ends of which are all connected with the parallel jaws, while the crossed levers D are referred to as "one-arm" crossed levers.

The screw-threaded shaft B is hollow throughout its entire length and extends throughout the entire length of the handle I, whereby when twisting a wire or other similar material the same can be drawn longitudinally through the handle and shaft, while the clamping-jaws are simultaneously used for twisting or bending the same. To facilitate holding the wire while bending or twisting the same, the opposing clamping-faces of the jaws are provided with V-shaped notches M.

Having thus described my invention, what I claim as new, and desire to secure by Letters Patent, is—

1. In a hand-vise of the class described the combination of a pair of parallel jaws, a screw-threaded shaft centrally located between said jaws, two pairs of crossed levers pivotally connected at their outer or diverging ends with said jaws and at their converging ends through a sleeve and nut with said central shaft.

2. In a hand-vise of the class described the combination of a pair of parallel jaws, a screw-threaded shaft provided with an operating-handle centrally located between said jaws, two pairs of crossed levers located upon the respective sides of said jaws and central shaft, both pairs of said levers being pivotally connected at their outer or diverging ends with said jaws and at their converging ends through a sleeve and nut with said central shaft.

3. In a hand-vise of the class described the combination of a pair of parallel jaws, a screw-threaded shaft provided with an operating-handle centrally located between said jaws, two pairs of two-armed crossed levers and two pairs of one-arm crossed levers located upon the respective sides of said jaws and central shaft, both pairs of said levers being pivotally connected at their outer or diverging ends with said jaws and at their converging ends one through a sleeve and the other through a nut with said central shaft, one end of both pairs of said two-armed crossed levers being provided with sliding pivotal connections with one end of said jaws.

4. In a hand-vise of the class described the combination of a pair of parallel jaws, a hollow screw-threaded shaft centrally located between said jaws, two pairs of crossed levers pivotally connected at their outer or diverging ends with said jaws and at their converging ends through a sleeve and nut with said central shaft.

In testimony whereof I affix my signature in the presence of two witnesses.

HARRY T. MARTIN.

Witnesses:
 JAS. B. ERWIN,
 O. R. ERWIN.